United States Patent

[11] 3,540,742

| [72] | Inventor | Herbert E. Tracy<br>Alhambra, California |
|---|---|---|
| [21] | Appl. No. | 662,247 |
| [22] | Filed | July 18, 1967<br>Division of Ser. No. 469,700,<br>July 6, 1965, abandoned, which is<br>a continuation of Ser. No. 791,859,<br>Jan. 2, 1969, now Pat. No. 3,526,408. |
| [45] | Patented | Nov. 17, 1970 |
| [73] | Assignee | Borg-Warner Corporation<br>Chicago, Illinois<br>a corporation of Illinois |

[54] MECHANICAL SEAL CONSTRUCTION
2 Claims, 3 Drawing Figs.

[52] U.S. Cl. .................................................. 277/88,
277/74, 277/75, 277/77, 277/136
[51] Int. Cl. ............................................... F16j 15/36
[50] Field of Search .......................................... 277/71, 72,
74–77, 88, 88VD, 81, 90; 103/111D. 111D1, ATD

[56] References Cited
UNITED STATES PATENTS
2,326,824  8/1943  Browne et al. ................
2,574,808  11/1951  Wolfe ...........................

Primary Examiner—Laverne D. Geiger
Assistant Examiner—Jeffrey S. Mednick
Attorneys—Donald W. Banner, Lyle S. Motley, C. G. Stallings and William S. McCurry ABSTRACT: A mechanical seal assembly having a sealing ring carried by a shaft and being rotatable relative to a stationary sealing ring sealed to a portion of the housing by a bellows. An adapter ring surrounds the shaft and is mounted on the housing for adjustable axial sliding movement. The bellows surrounds the shaft and has one end fixedly sealed to the nonrotatable sealing ring means and the other end to the adapter ring.

HERBERT E. TRACY
INVENTOR.
BY John O. Evans, Jr.
ATTORNEY

HERBERT E. TRACY
INVENTOR.

BY John O. Evans, Jr.

ATTORNEY

MECHANICAL SEAL CONSTRUCTION

This application is a division of my copending application Ser. No. 469,700, filed July 6 1965, now abandoned for "Mechanical Seal Construction," said copending application having been abandoned in favor of a continuation thereof filed on Jan. 2, 1969, and assigned Ser. No. 791,859 now U.S. Pat. No. 3,526,408.

This invention relates to mechanical seals.

In conventional centrifugal pumps, the impeller shaft extends through an opening in the pump housing and is rotated by a motor external to the housing. A mechanical seal may be employed for rotatably sealing the shaft to the housing to prevent the flow of fluid from the housing outwardly through the space between the shaft and the shaft opening. Such a mechanical seal has a rotary sealing ring or element fixed to and sealed to the shaft for rotation with the latter. A stationary or nonrotary sealing ring has a radial sealing face opposed to a cooperating radial sealing face on the rotary sealing ring. The stationary sealing ring is sealed to the housing. One of the sealing rings is movable axially with respect to the shaft and is biased by spring means or the like into sealing relationship with the other ring. In operation, the liquid within the pump housing, which is under high pressure, flows at a low rate from the interior of the housing outwardly between the opposed sealing faces of the sealing rings to form a thin film of liquid between the sealing faces. This film of liquid lubricates and cools the sealing faces. During periods when the pump is not operating, the thin film of liquid may be lost from between the sealing faces, leaving the latter in direct contact with each other with no lubricating liquid between them. When the pump is started under these conditions, the sealing faces rub against each other in a dry state for the first few revolutions of the shaft, causing undue wear of the faces.

It is an object of this invention to provide a mechanical seal wherein lubricating fluid can be introduced between the sealing faces prior to startup of a device embodying the seal.

Mechanical seal arrangements have employed a metal bellows to seal a nonrotary sealing ring to a housing. The metal bellows is under axial compression between the sealing ring and the housing and serves to preload the sealing ring and press it into sealing relationship with a complementary rotary sealing ring. Relative rotation of the sealing rings exerts a torque which twists the bellows, distorting it and affecting the force with which it presses the fixed sealing ring towards the rotary sealing ring.

Thus another object of the invention is to provide a mechanical seal having a bellows as aforesaid and wherein the undesirable torque referred to is counteracted.

In mechanical seals employing bellows, normal wear of the sealing surfaces of the sealing rings, manufacturing tolerances, end play of the shaft, and the like, cause variations in the position of the nonrotary sealing ring with respect to the housing and corresponding variations in the length of the bellows, thus varying the axial force exerted by the bellows on the nonrotary sealing ring.

Therefore, it is a further object of this invention to provide a mechanical seal wherein the bellows may be adjusted to compensate for the variations referred to.

Briefly stated, a mechanical seal in accordance with the present invention includes: a housing having a shaft opening therethrough; a rotatable shaft extending through the opening and spaced from its walls; rotary sealing ring means sealingly fixed to the shaft; nonrotatable, axially movable sealing ring means; the sealing ring means having opposed, relatively rotatable sealing faces; cooperating key means on the nonrotatable, axially movable sealing ring means and on the housing restraining the sealing ring means from rotation yet permitting it to move axially; an adapter ring surrounding the shaft and mounted in the housing for axial sliding movement; gasket means slidably sealing the adapter ring to the housing; a bellows surrounding the shaft, one end of the bellows being fixedly sealed to the nonrotatable, axially movable sealing ring means and the other end of the bellows being fixedly sealed to the adapter ring; and means for axially sliding the adapter ring in the housing to vary the axial force exerted by the bellows upon the nonrotatable, axially movable sealing ring means when the latter is in sealing relation to the rotary sealing ring means. Specifically and preferably, the means for axially sliding the adapter ring in the housing includes a plurality of axially extending screws threaded in the housing and bearing against the adapter ring.

The invention will be described with greater particularity, and other of its aims, objects, and advantages will be apparent from or set forth in the following detailed description of one embodiment of the invention taken with the accompanying drawings in which.

Figure 1:
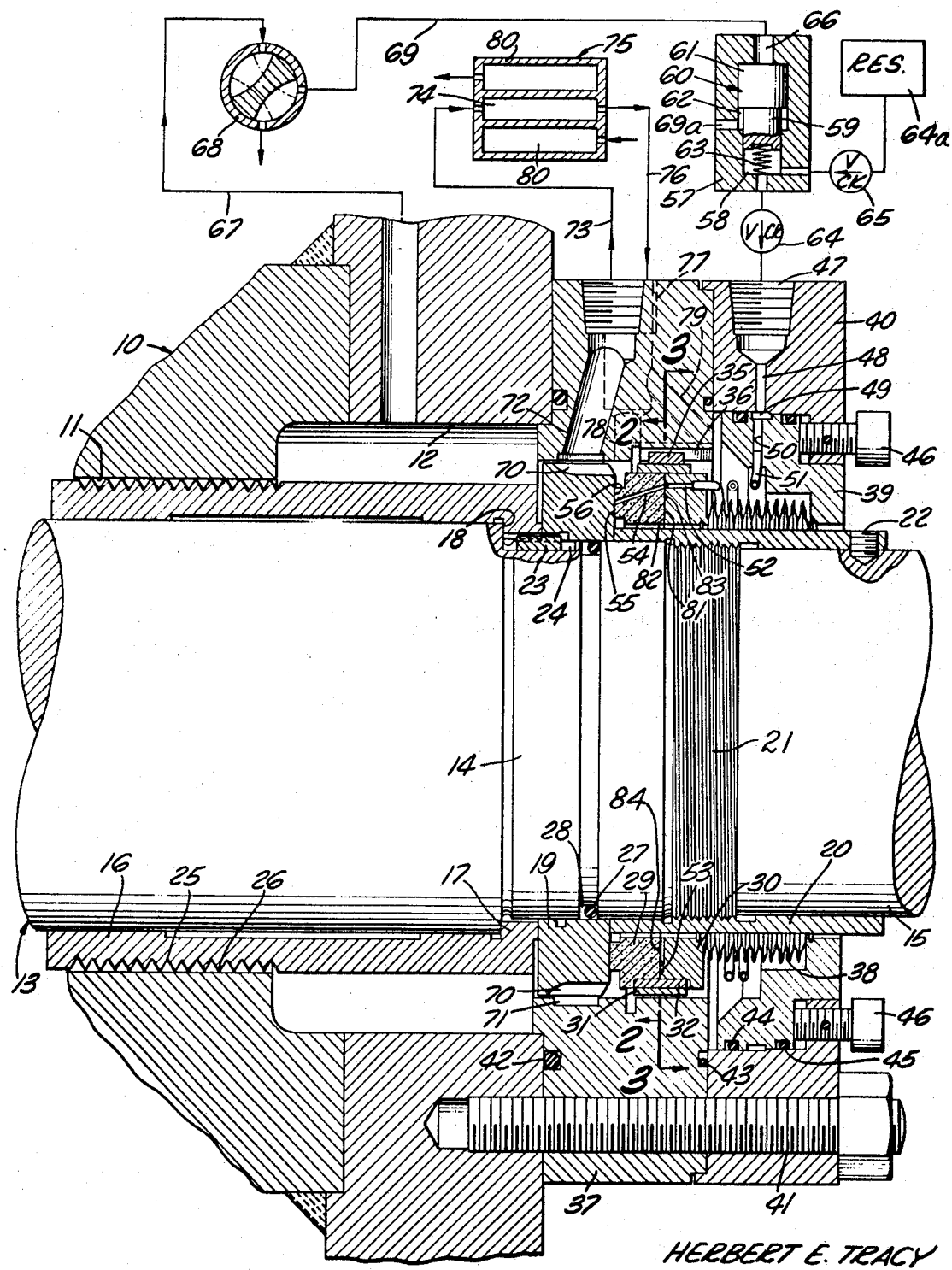
FIG. 1 is an axial sectional view of a portion of a pump housing showing an illustrative mechanical seal in accordance with the invention together with associated equipment, this view being taken along the line 1-1 of FIG. 2 or FIG. 3 looking in the direction of the arrows.

Referring to the drawings, the reference numeral 10 designates generally a housing, such as a centrifugal pump housing, having a shaft opening extending therethrough, the opening including a restricted bore 11 and an enlarged bore 12. A shaft 13 extends through the opening in the housing. A centrifugal pump impeller (not shown) may be mounted on the left-hand end of the shaft as seen in FIG. 1, and a driver (not shown), such as an electric motor, may be drivingly connected to the right-hand end of the shaft.

The shaft has a reduced portion 14 and a still further reduced portion 15. A sleeve 16, having an inturned flange 17, is mounted on the shaft with the flange 17 in abutment with a shoulder 18 on the shaft. A rotary sealing ring 19 is mounted on the reduced shaft portion 14 with the inner face of the sealing ring in abutment with the flange 17 of the shaft sleeve. A nut 20 is threaded to the shaft by threads 21 and is screwed into engagement with the outer face of the sealing ring 19 to retain the latter in place by clamping it between the flange 17 and the retaining nut. The retaining nut is secured against becoming loose by a set screw 22. The shaft sleeve 16 and the rotary sealing ring 19 are prevented from rotating with respect to the shaft by a key 23 received in a keyway 24 in the shaft and in the complementary opposed keyways in the flange 17 of the shaft sleeve and in the rotary sealing ring.

The shaft sleeve 16 is provided with a plurality of parallel, circumferential grooves 25 forming V-shaped ridges 26. The outer peripheries of these ridges lie adjacent to the restricted bore 11 of the housing, and form with the bore a labyrinth seal that restricts or limits outward flow of fluid from the interior of the housing 10, through the clearance between the shaft sleeve 16 and the restricted bore 11, and into the enlarged bore 12.

In a groove 28 in the reduced portion 14 of the shaft is an O-ring 27 for preventing flow of fluid outwardly along the shaft and between the rotary sealing ring 19 and the reduced portion of the shaft.

The shaft 13 is journaled in suitable bearings (not shown), as is conventional.

Figure 2:
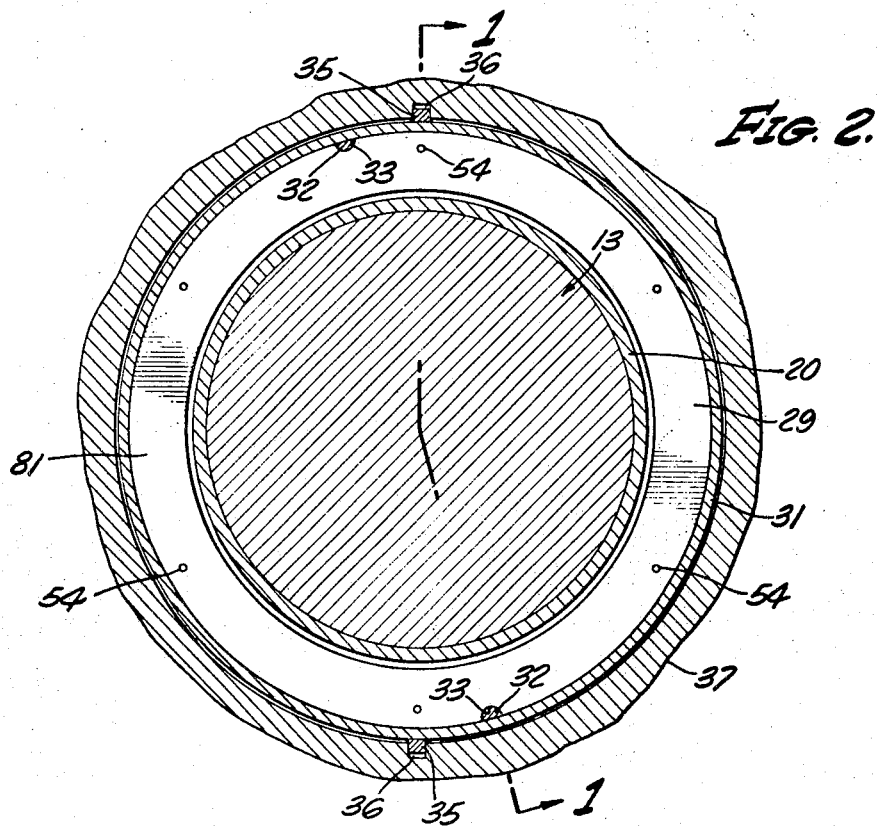
FIG. 2 is a transverse sectional view taken along the section line of FIG. 1 looking in the direction of the arrows 2-2.
Figure 3:
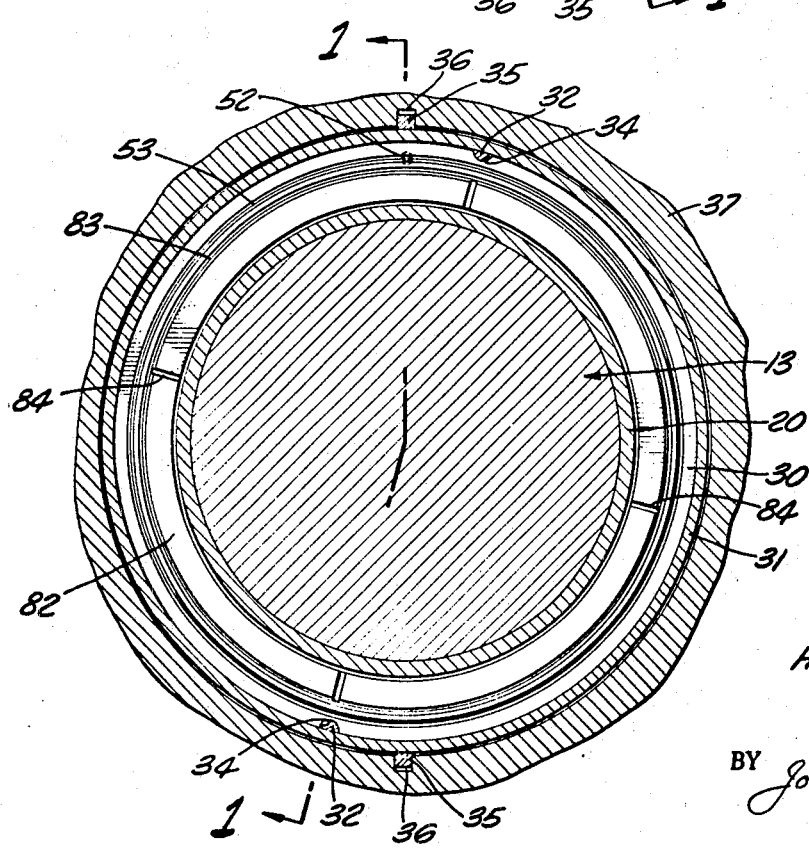
FIG. 3 is a transverse sectional view taken along the same section line of FIG. 1 looking in the direction of the arrows 3-3.

A stationary or nonrotary sealing ring 29 is arranged in sealing relation to the rotary sealing ring 19. The fixed sealing ring is mounted upon a backing ring 30 by means of a mounting ring 31 that encircles both the stationary sealing ring and the backing ring. As best seen in FIGS. 2 and 3, the mounting ring 31 has a pair of diametrically disposed, axially arranged keys 32 that are received in slots 33 in the fixed sealing ring 29 and aligned slots 34 in the backing ring 30. Extending radially outwardly from the mounting ring 31 is a pair of keys 35 that are diametrically disposed and that are received in keyways 36 in a flange 37. With this construction, the fixed sealing ring 29 is securely mounted upon the backing ring 30 by the mounting ring 31. The keys 32 prevent relative rotation between the fixed sealing ring and its backing ring and mounting ring. The keys 35 prevent relative rotation of the ring assembly with respect to the flange 37.

One end of a metallic bellows 38 is welded to the outer face of the backing ring 30. The other end of the bellows is welded to a bellows adapter 39. The bellows adapter is received within an auxiliary flange 40 which, in turn, is mounted upon the flange 37. Bolts, such as the 41, secure the flange 37 and auxiliary flange 40 to the housing 10. Leakage between the housing 10 and the flange 37 is prevented by an O-ring 42, and leakage between the flange 37 and the auxiliary flange 40 is prevented by another O-ring 43. O-rings 44 and 45 provide gasket means to prevent loss of fluid between the auxiliary flange 40 and the bellows adapter 39.

The bellows adapter 39 is axially slidable in the auxiliary flange 40. Adjusting screws 46,46 are employed to set the bellows adapter at a selected axial position for attaining the desired compression of the bellows 38. Thereby, the nonrotary sealing ring 29 may be preloaded with a desired force to urge it against the rotary sealing ring 19.

Provision is made for injecting lubricating fluid between the opposed sealing faces of the sealing rings 19 and 29. For this purpose, a tapped hole 47 is provided in the periphery of the auxiliary flange 40. Lubricating fluid is conducted from the bottom of this hole through a bore 48 to an annular slot 49 in the periphery of the bellows flange 39. Another bore 50 leads radially inward through the bellows adapter from the slot 49. One end of a continuous length of flexible metal tubing 51 is sealed into the inner end of the bore 50. The metal tubing is coiled about the bellows 38, the other end of the tubing being sealed into an axial bore 52 that extends through the backing ring 30. As best seen in FIG. 3, the inner end of the bore 52 opens into an annular slot 53 formed in the backing ring 30. There is a plurality of longitudinal bores 54 extending through the nonrotary sealing ring 29. Six such bores are appropriate, and this number is shown in FIG. 2 of the drawings. Each of these bores 54 communicates at one end with the annular groove 53 in the backing ring and opens at the other end into the sealing face 55 of the nonrotary sealing ring. Thus, when lubricating fluid under pressure is introduced into the tapped hole 47, it can flow through the bore 48, the groove 49, the bore 50, the flexible metal tubing 51, and into the bore 52 in the backing ring. The lubricating fluid then flows through the bore 52 into the annular groove 53 in the backing ring and thence through the bores 54 into the space between the sealing face 55 of the nonrotary sealing ring and the sealing face 56 of the rotary sealing ring 19.

A typical device for supplying lubricant to the tapped hole 47 includes a cylinder 57 having a bore 58 into which one end 59 of a double-headed piston 60 is slidably fitted. The other end 61 of the piston is of larger diameter than said one end and is slidably fitted in a bore 62. The piston 60 is normally held in its upper position, as illustrated, by a spring 63. The bore 58 of the cylinder is placed in communication with the tapped hole 47 through a check valve 64. A lubricant reservoir 64a communicates with the lower bore 58 of the cylinder through another check valve 65.

In the upper end of the cylinder 57, there is formed a port 66 through which fluid for actuating the piston is admitted. Fluid for operating the piston may be obtained conveniently from the enlarged bore 12 in the housing 10. For this purpose, a conduit 67 leads from the bore 12 to a three-way valve 68. In the dotted line position of the valve, fluid will flow from the conduit 67 through a conduit 69 to the port 66 of the cylinder. When the valve is in the full line position, operating fluid is exhausted from the upper end of the cylinder through the port 66 and the conduit 69. It will be noted that the cylinder 57 has a vent 69a that prevents air being trapped in the cylinder bore 62 below the piston portion 61.

It is believed that the operation of the device for injecting lubricant between the sealing faces of the mechanical seal rings will be obvious from the foregoing description. In brief, however, when the piston 61 is moved to the illustrated position from a depressed position, lubricating fluid is drawn from the reservoir 64a into the bore 58 through the check valve 65. When the piston is depressed, this lubricating fluid is forced through the check valve 64 into the tapped inlet 47 and thence to the space between the sealing faces 55 and 56 through the channels hereinbefore described.

Movement of the piston 60 downwardly to accomplish this result is under control of the valve 68. When the valve is turned to the dotted line position, pressure fluid from the enlarged bore 12 is admitted to the cylinder above the piston end 61 to force it downwardly. Then, when the valve is turned to the full line position, the spring 63 returns the piston 60 to its upper position to draw another charge of lubricant fluid into the bore 58.

The mechanical seal shown and described herein includes apparatus for cooling the seal. This apparatus forms no essential part of the present invention. For a fuller description of cooling apparatus of this type, reference is made to U.S. Pat. No. 2,824,759, issued Feb. 25, 1958, Herbert E. Tracy, for LIQUID COOLED SEAL, which patent is assigned to the assignee of the present application. The cooling device includes pump vanes 70 formed in the periphery of the rotary sealing ring 19. As the shaft is turned, these vanes impel fluid from around the sealing rings into an annular channel 71 provided in the flange 37 adjacent to the pump vanes. From this annular channel, fluid is forced outwardly through a bore 72 in the flange and through a conduit 73 to the central section 74 of a heat exchanger 75. Cooled fluid from the central section 74 flows through a conduit 76 to a cool-fluid inlet 77 in the flange 37. The cool fluid is returned to the vicinity of the sealing rings through the conduits 78 and 79. After cooling the sealing rings and adjacent parts, the fluid is recirculated by the pump vanes 70 through the heat exchanger 75. The heat exchanger has an outer section 80, 80 through which a cooling fluid is circulated in indirect heat-exchange relation with the fluid that flows through the central section 74 of the heat exchanger.

The surface 81 of the nonrotary sealing ring 29 that is in contact with the surface 82 of the backing ring 30 is lapped, as is also the surface 82, to provide with the latter a fluidtight joint. As best seen in FIGS. 1 and 3, this joint includes an annular groove 83 formed in the surface 82 of the backing ring, which annular groove is connected by a plurality of radial grooves 84 with the inner periphery of the backing ring. The annular groove 83 is in communication with the outer atmosphere through the radial grooves 84 and the interior of the bellows 38. By this means, the resultant force exerted by fluid pressure inside the housing that presses the backing ring into fluidtight contact with the nonrotary sealing ring is concentrated in an annular zone that lies between the annular groove 83 and the outer peripheries of the nonrotary sealing ring 29 and the backing ring 30. Thereby, an improved sealing relation is established between the backing ring and the nonrotary sealing ring. This joint forms no essential part of the present invention. For a fuller description of this type of joint, reference is made to the application of Winfred J. Wiese, for MECHANICAL SEAL, issued Jan. 4, 1966, as U.S. Pat. No. 3,227,463, which application is a continuation of abandoned U.S. application, Ser. No. 83,476, entitled MECHANICAL SEAL, which application was filed Jan. 18, 1961, in the name of Winfred J. Wiese. Both of said applications are assigned to the assignee of the present application.

Various changes may be made in the form of the invention herein disclosed by way of example without departing from the terms and concepts of the invention. Such changes will be apparent to those skilled in the art and are intended to be within the scope of the following claims.

I claim:
1. A mechanical seal comprising:
 a. a housing having a shaft opening therethrough;
 b. a rotatable shaft extending through said opening and spaced from its walls;
 c. rotary sealing ring means sealingly fixed to said shaft;
 d. nonrotatable, axially movable sealing ring means;

e. said sealing ring means having opposed, relatively rotatable sealing faces;
f. cooperating key means on said nonrotatable, axially movable sealing ring means and on said housing restraining said sealing ring means from rotation yet permitting it to move axially;
g. an adapter ring surrounding said shaft and mounted in said housing for axial sliding movement;
h. gasket means slidably sealing said adapter ring to said housing;
i. a bellows surrounding said shaft, one end of said bellows being fixedly sealed to said nonrotatable, axially movable sealing ring means and the other end of said bellows being fixedly sealed to said adapter ring; and
j. means for axially sliding said adapter ring in said housing to vary the axial force exerted by said bellows upon said nonrotatable, axially movable sealing ring means when the latter is in sealing relation to said rotary sealing ring means.

2. A mechanical seal comprising:
a. a housing having a shaft opening therethrough;
b. a rotatable shaft extending through said opening and spaced from its walls;
c. rotary sealing ring means sealingly fixed to said shaft;
d. nonrotatable, axially movable sealing ring means;
e. said sealing ring means having opposed, relatively rotatable sealing faces;
f. cooperating key means on said nonrotatable, axially movable sealing ring means and on said housing restraining said sealing ring means from rotation yet permitting it to move axially;
g. an adapter ring surrounding said shaft and mounted in said housing for axial sliding movement;
h. gasket means slidably sealing said adapter ring to said housing;
i. a bellows surrounding said shaft, one end of said bellows being fixedly sealed to said nonrotatable, axially movable sealing ring means and the other end of said bellows being fixedly sealed to said adapter ring;
j. means for axially sliding said adapter ring in said housing to vary the axial force exerted by said bellows upon said nonrotatable, axially movable sealing ring means when the latter is in sealing relation to said rotary sealing ring means; and
k. wherein said means for axially sliding said adapter ring in said housing comprises a plurality of axially extending screws threaded in said housing and bearing against said adapter ring.